United States Patent [19]
Matick et al.

[11] Patent Number: 6,081,872
[45] Date of Patent: Jun. 27, 2000

[54] CACHE RELOADING PERFORMANCE IMPROVEMENT THROUGH THE USE OF EARLY SELECT TECHNIQUES WITH AND WITHOUT PIPELINING

[75] Inventors: Richard Edward Matick, Croton-on-Hudson; Stanley Everett Schuster, Granite Springs, both of N.Y.

[73] Assignee: International Business Machines Corporation, Armonk, N.Y.

[21] Appl. No.: 08/888,730

[22] Filed: Jul. 7, 1997

[51] Int. Cl.[7] .................................................. G06F 12/00
[52] U.S. Cl. ..................... 711/122; 711/140; 711/133; 711/126; 711/118
[58] Field of Search ..................... 711/113, 126, 711/122, 100, 118, 133, 140; 395/728

[56] References Cited

U.S. PATENT DOCUMENTS

| | | | |
|---|---|---|---|
| 5,701,503 | 12/1997 | Singh et al. | 711/126 |
| 5,732,409 | 3/1998 | Ni | 711/113 |
| 5,796,671 | 8/1998 | Wahlstrom | 365/230.03 |
| 5,801,996 | 9/1998 | Seyyedy et al. | 365/189.05 |
| 5,832,276 | 11/1998 | Feiste et al. | 395/728 |

FOREIGN PATENT DOCUMENTS

| | | |
|---|---|---|
| 1 354 827 | 5/1972 | United Kingdom . |
| 2 235 554 | 3/1991 | United Kingdom . |

*Primary Examiner*—John W. Cabeca
*Assistant Examiner*—David Langjhar
*Attorney, Agent, or Firm*—Whitham, Curtis & Whitham; Wayne L. Ellenbogen

[57] ABSTRACT

A DRAM for L2 cache is used in a computer memory hierarchy without compromising overall system performance. By proper organization and design, the DRAM L2 cache is many times larger than a SRAM implementation in the same technology, but without compromising overall system performance. The larger DRAM capacity compared to a SRAM gives a substantially better HIT ratio which compensates for any small degradation due to access time. To achieve this, it is essential to minimize the total DRAM access time as much as possible by the use of early select techniques and pipelining.

28 Claims, 11 Drawing Sheets

CACHE RELOADING PERFORMANCE IMPROVEMENT THROUGH THE USE OF EARLY SELECT TECHNIQUES WITH AND WITHOUT PIPELINING

DESCRIPTION

BACKGROUND OF THE INVENTION

1. Field of the Invention

The present invention generally relates to computer memory systems and, more particularly, to a memory hierarchy which comprises a level one (L1) cache with access/cycle time equal to or faster than the processor cycle time and an L2 cache consisting of a directory and data array in which the L2 directory is accessed upon a miss to the L1 cache, the L2 cache requesting a block reload from the L3 cache of the hierarchy if a miss to the L2 cache occurs. The L2 cache is a DRAM, which can be many times larger than a SRAM implementation in the same technology, built in a manner that does not compromise overall system performance.

2. Background Description

An L1 cache is typically implemented in static random access memory (SRAM) technology for speed. L2 caches are typically also implemented in SRAM technology for speed, but the high cost limits the L2 capacity. A larger capacity could be obtained by using dynamic random access memory (DRAM) technology, but the compromise in speed is usually not acceptable for high performance systems.

An L2 cache must interface to a higher-level L1 cache to supply blocks (lines) for reloading any L1 misses, and simultaneously interface to a lower level, L3 cache when misses occur within the L2 cache. (In a multi-processor configuration, there are other interfaces as well.) These interfaces can all take place on one bus, or on independent buses, with the latter giving substantially better performance. While this disclosure is applicable to any such cases above, for simplicity, it will be embodied in a uniprocessor system with independent bus interfaces to the L1 and L3 levels of the memory hierarchy.

An L2 cache which interfaces to a high-performance processor L1 cache for the required L1 reloads, and to an L3 or main memory for the L2 accesses/reloads, has special requirements in terms of both speed and organization. Typically, all levels of a memory hierarchy below the L1 cache (L1 is considered the highest level, closest to the processor), will access the data arrays mainly on a block boundary. A miss in the L1 cache will request a reload of a full L1 cache line (block) which can be 64 to 256 bytes, with 128 being a typical, current value. Similarly, misses in L2 cache will request the reload of a block (line) from L3 cache or main memory and so on. In cases where a store-through policy is used, individual word, double word, or other logical unit smaller than a block or line, is stored in L2 cache whenever a store is performed in L1 cache, but this is seldom used, nor does it change the need for a block access on a miss/reload. In order to maintain high hit ratios and high performance (short reload start time), such an L2 cache would desirably be organized as a four-way, set-associative, late-select cache. But such an organization presents several fundamental problems. A typical late-select, set-associative cache accesses the congruence class of the directory simultaneously with the congruence class of the array. This means that four entries, i.e., four virtual addresses with other appropriate bits, are accessed out of the directory array, the virtual address compares are done on the periphery of the array for a match, and a late-select signal is generated, corresponding to the match.

Simultaneously with the directory access, the data array is accessed for four blocks (lines) which correspond to the same four entries accessed from the directory. These four blocks (lines) are latched in data-buffers at the edge of the data array. The late select signal then selects the line which corresponds to the matched virtual address. The access time requirements are that the directory access, compares, and late-select signal must be completed before or at the same time that the four lines are latched at the edge of the data array. Since the data array will be much larger than the directory, it will be much slower, so the late select signals from the directory are usually ready by the time the data array has latched the four blocks from the congruence class.

The above organizations apply equally to SRAM and DRAM L2 designs. However, the wide data paths needed are actually easier to obtain with DRAM than with SRAM arrays. For instance, DRAMs already have many more sense amplifiers on-chip than do typical SRAMs. (DRAMs being destructive read-out require one sense amplifier per each bit line on any word line. Each bit along a word line is read and must be sensed and regenerated.) On SRAM chips, the sense amplifiers are typically much larger, to provide speed, and require a larger "pitch" spacing (encompass more bit line pitches) as well as considerably more power. Thus, DRAM designs have at least this inherent advantage, although speed is compromised. However, even though DRAM chips have this inherent large data path width, this data path size is still a key issue in the overall chip design and layout.

One difficulty is that accessing a full congruence class of four lines from the data array requires a very large data path out of the array. For instance, a 128 byte L2 block (line) in a four-way, set-associative, late-select organization would require accessing a 128×8×4=4K bit data path out of the DRAM array. While doable, the resulting structure is somewhat large, and presents a number of difficulties in terms of array/island organization, length of word lines, bit lines, power, on chip busing, to name a few. A 256K byte line would obviously require twice this or an 8K bit data path out of the DRAM array which further compounds the difficulties. The problem is even worse for SRAM designs, so set-associative, late-select organizations are rarely used for SRAM L2 caches. Rather, Direct-mapped SRAM L2 cache organizations are typically used which compromises the performance and is to be avoided if possible.

The fundamental design issue is to provide an L2 cache design and organization which will not compromise speed but still allow a simple chip design using DRAM for the data array.

SUMMARY OF THE INVENTION

It is therefore an object of the invention to use a DRAM for L2 cache without compromising overall system performance.

According to the invention, by proper organization and design, a DRAM L2 cache is built which can be many times larger than a SRAM implementation in the same technology, but without compromising overall system performance. By proper system organization and some DRAM design innovations, it is possible to achieve a DRAM L2 cache with better performance than an SRAM L2 cache. The larger DRAM capacity compared to a SRAM gives a substantially better HIT ratio which compensates for any small degradation due to access time. To achieve this, it is essential to minimize the total DRAM access time as much as possible, and this is a key consideration in the present invention. While all the innovative concepts of the present invention described in more detail below could be applied to a SRAM design as well, the preferred embodiment of the invention takes advantage of the greater capacity of a DRAM in the L2 cache of a memory hierarchy.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

A basic requirement for any L1 cache is that it should be capable of being accessed on every processor cycle, if necessary. Typical multiple-issue, high performance processors are capable of executing four to six instructions per cycle, and thus one cache access per cycle, for long periods. Hence, the total cache image seen by the processor for HITs must be capable of at least one access per processor cycle. A fundamental limit of DRAM arrays is that their access/cycle time is generally much longer than the cycle time of high-speed processors. Thus, without any special features, it is not possible to start a DRAM access every processor cycle. This is the assumption made here, namely that the DRAM cycle time is longer than the processor cycle time.

There are a number of potential organization which can be used to improve the performance of an L2 cache system. Several of these will be illustrated below, with one being the preferred embodiment.

Figure 1:
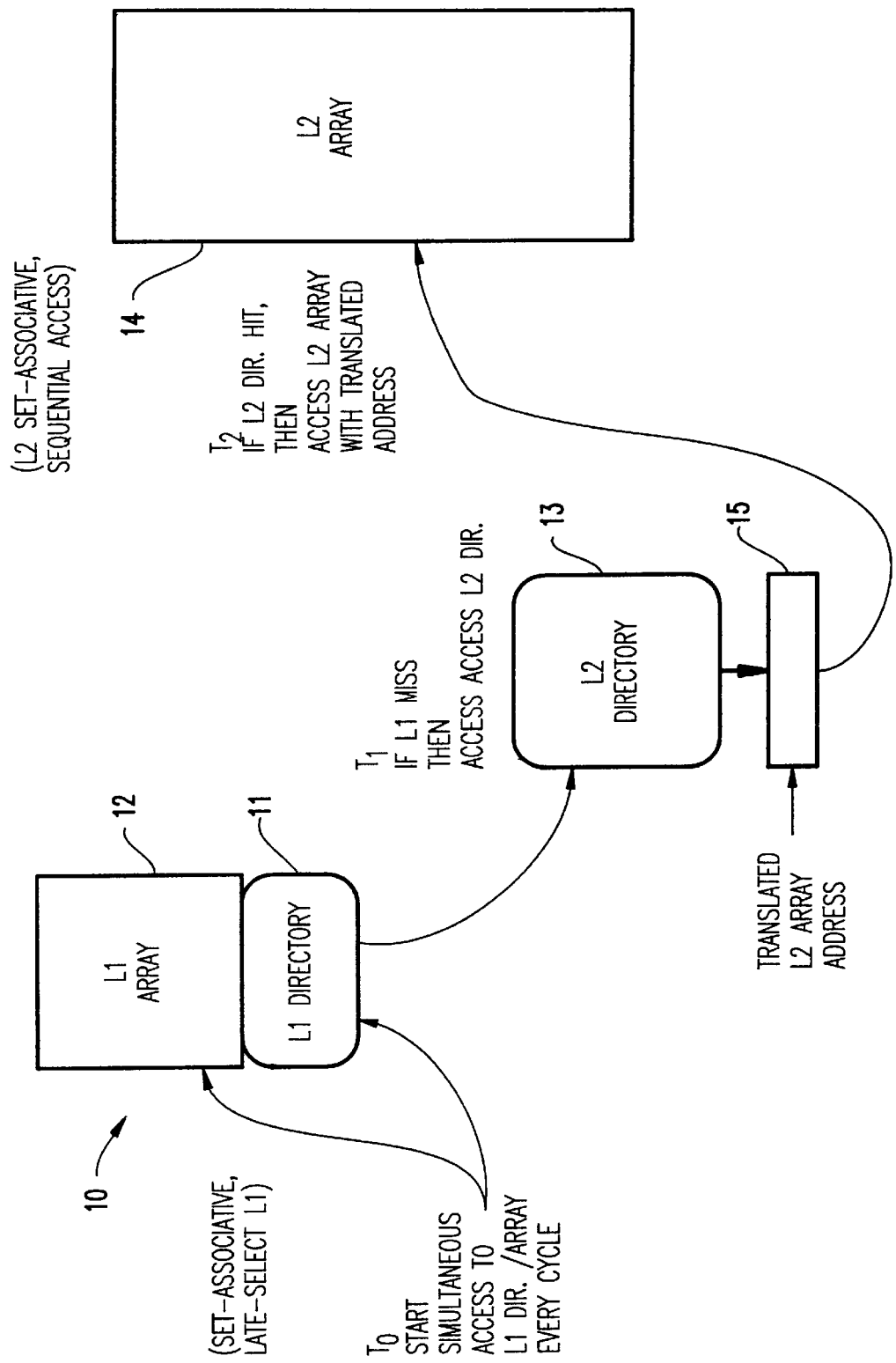
FIG. 1 is a block diagram illustrating the L2 cache directory and array organized in a sequential-access mode in which the L2 directory translates a virtual address after the L1 cache indicates a miss and the L2 cache is accessed if there is a hit in the L2 directory.

CASE I
Set-Associative, Sequential Access L2 Cache Using DRAM Data Array With Set-Associative, Late-Select L1 Cache The first possible organization shown in FIG. 1 uses a standard L1 cache 10 organization which is assumed to be a one-cycle cache, achieved by use of a set-associative, late-select organization in which the L1 directory 11 and L1 data array 12 are started on the same cycle as previously described. The L2 directory 13 and L2 data array 14 are both sequentially organized such that if a MISS occurs in the L1 cache 10, the L2 directory 13 is accessed on the next cycle, while the L2 data array 14 waits for the translated L2 array address 15 as shown in FIG. 1. The L2 directory 13 can be a SRAM array and thus can complete its translation in one processor cycle. The L2 DRAM data array 14, since it cannot start a new access every cycle, is started only when the L2 directory 13 completes and indicates which block is to be accessed, if any. The L2 data array 14 can be set-associatively organized as the directory 13; this minimizes the number of data-array address bits which have to be stored in the directory. If the mapping of the L2 array 14 addresses is not set-associative, but rather is fully associative (a virtual block can reside in any physical address), then the full L2 physical address must be stored and obtained from the directory 13 for each hit. Either method can be used, or some method in between, even though the descriptions are given in terms of a set-associative organization.

As shown in FIG. 1, the L1 cache 10 is accessed at time T0 and is completed at time T1 which can be a total time of one cycle. If a MISS occurs, the L2 directory 13 is accessed starting at time T1 and completes at time T2. This total elapsed time can be one processor cycle, or more. If the L2 directory indicates a HIT, then the L2 data array 14 is accessed starting at time T2 and requires a total elapsed time of TD cycles. These values will include any boundary crossing and bus delays. Thus, if T0=0, then the total time to get the data to the processor for an L1 MISS and L2 HIT is $$T1+T2+TD=Tmiss(I), \qquad (1)$$

where T1 is the L1 access/cycle time, T2 is the L2 directory translate/access time, and TD is the full L2 array access time including any boundary crossings as well as the effective time to return the data to L1 cache 10.

Figure 2:
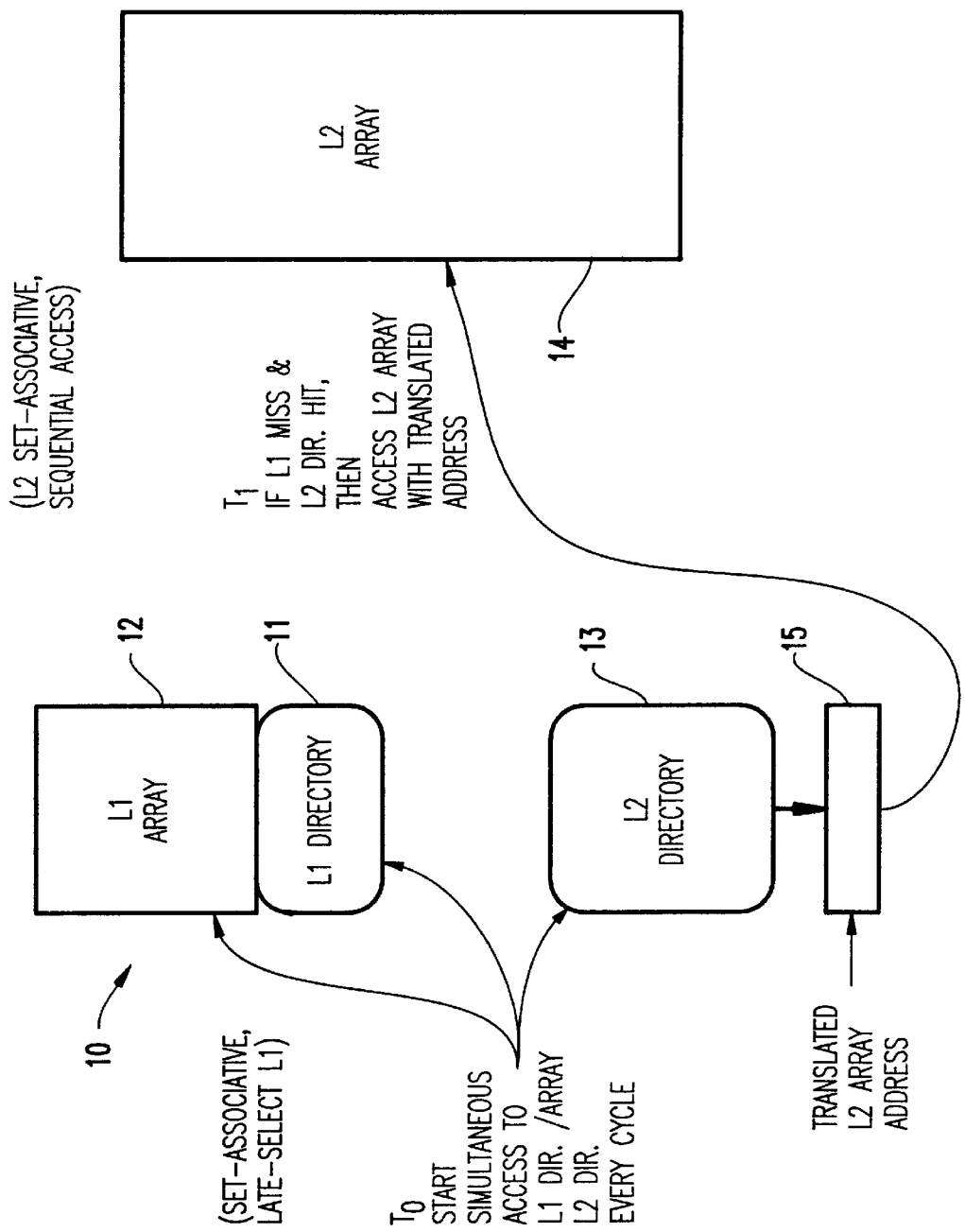
FIG. 2 is a block diagram illustrating the L2 cache directory and array organized in a sequential-access mode in which the L2 directory translates a virtual address starting at T0 and then accesses the array starting at time T1.

CASE II
L2 Organization Similar to CASE I but L2 Directory Started on Each Cycle with L1 Cache As indicated in FIG. 2, the L1 directory 11 and array 12 as well as the L2 directory 13 are always started at the same time, each processor cycle. Such an organization requires an L2 directory 13 which either has the same access/cycle time as the L1 cache 10 or, if longer, can be pipelined so a new cycle can be started on each L1 cycle. For instance, suppose the L1 cache 10 requires one processor cycle time, Tp, for access/cycle and suppose the L2 directory 13 is also one Tp for its access/cycle. Then for each L1 cache access, the L2 directory 13 is accessed in parallel, starting at time T0=0. If a MISS occurs in the L1 cache 10, then the translated L2 address is immediately available at 15, and the L2 data array 14 access can start immediately, at time T1. In this case, the total time to get the data for an L1 MISS and L2 HIT is $$Tmiss(II)=T1+TD. \qquad (2)$$

It can be seen that the delay in Equation (2) is one cycle shorter than that of CASE I given by Equation (1). This one cycle saving can be quite significant. For instance, an L2 cache design using a Merged-Logic-DRAM technology could give a DRAM access time TD of six Tp or less, so a one cycle saving is a significant percentage improvement for such as case.

If the L2 directory 13 full access time is longer than one Tp, for instance two Tp, the above organization is still valid provided the L2 directory 13 can be pipelined so that a new access can be started each cycle. This could be done in several ways. In a technology in which fast logic is integrated directly on the L2 SRAM directory chip, there are several choices.

Figure 3:
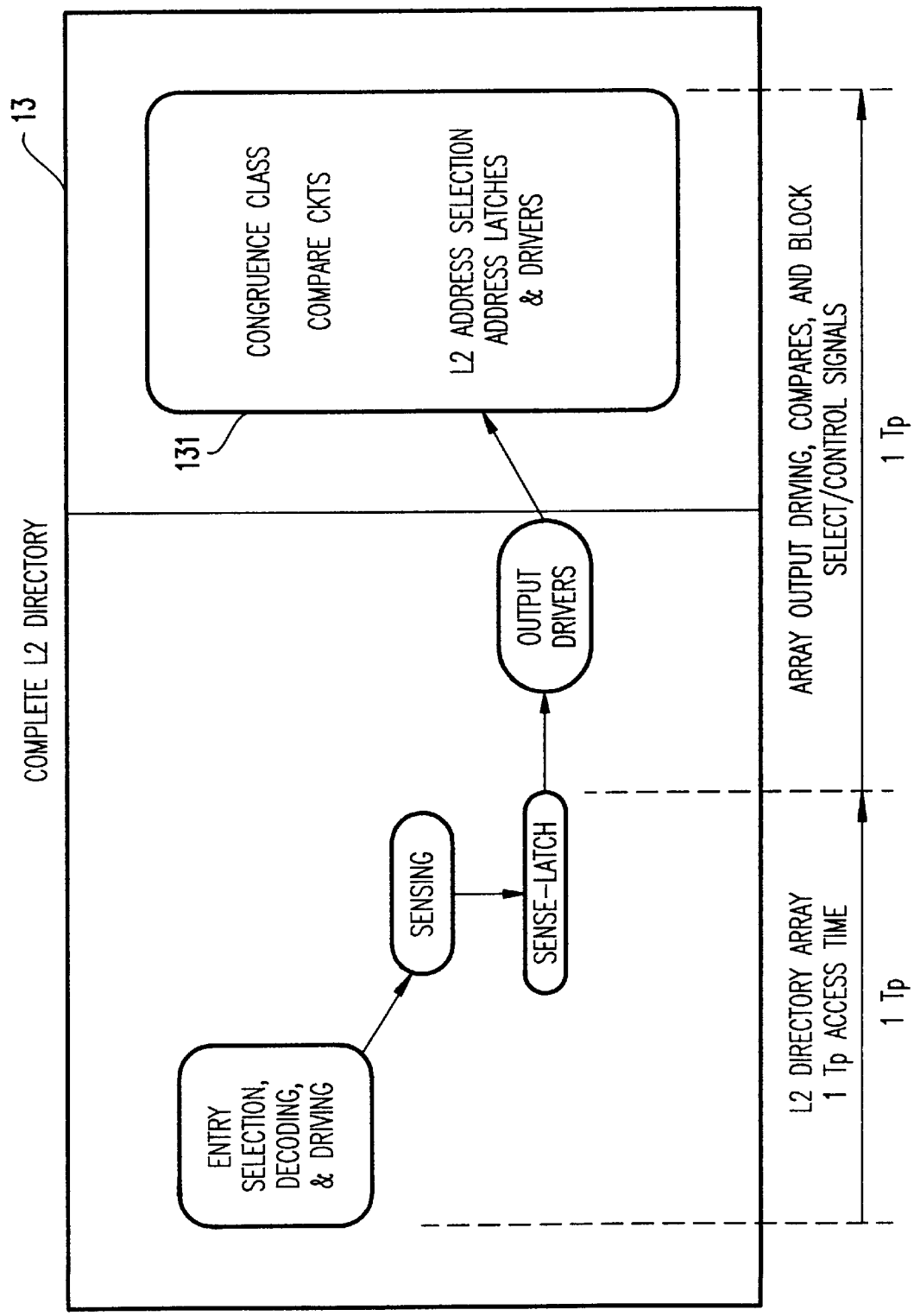
FIG. 3 is block diagram of the pipeline organization of the L2 directory for a one Tp cycle time, two Tp access time.

In FIG. 3, it is assumed the directory array access time requires one Tp cycle up through the first stage of sense-latching. At this time, a second directory access can begin while the data-out drivers drive the congruence class compare circuits 131 and latch the final physical address for the L2 cache data array 14 (FIG. 2). Typically, the compare circuits 131 will be large and slow, since four separate, large virtual addresses must be compared (30 to 50 bits or more in some cases, and continually increasing). Thus, a new access can be started to the L2 cache directory 13 (FIG. 2) each Tp cycle, and the result would be available on the subsequent cycle. This will add one cycle to the total Tmiss given by Equation (2) but still saves one cycle by starting the L2 directory 13 early, with the L1 cache directory and array.

Figure 4:
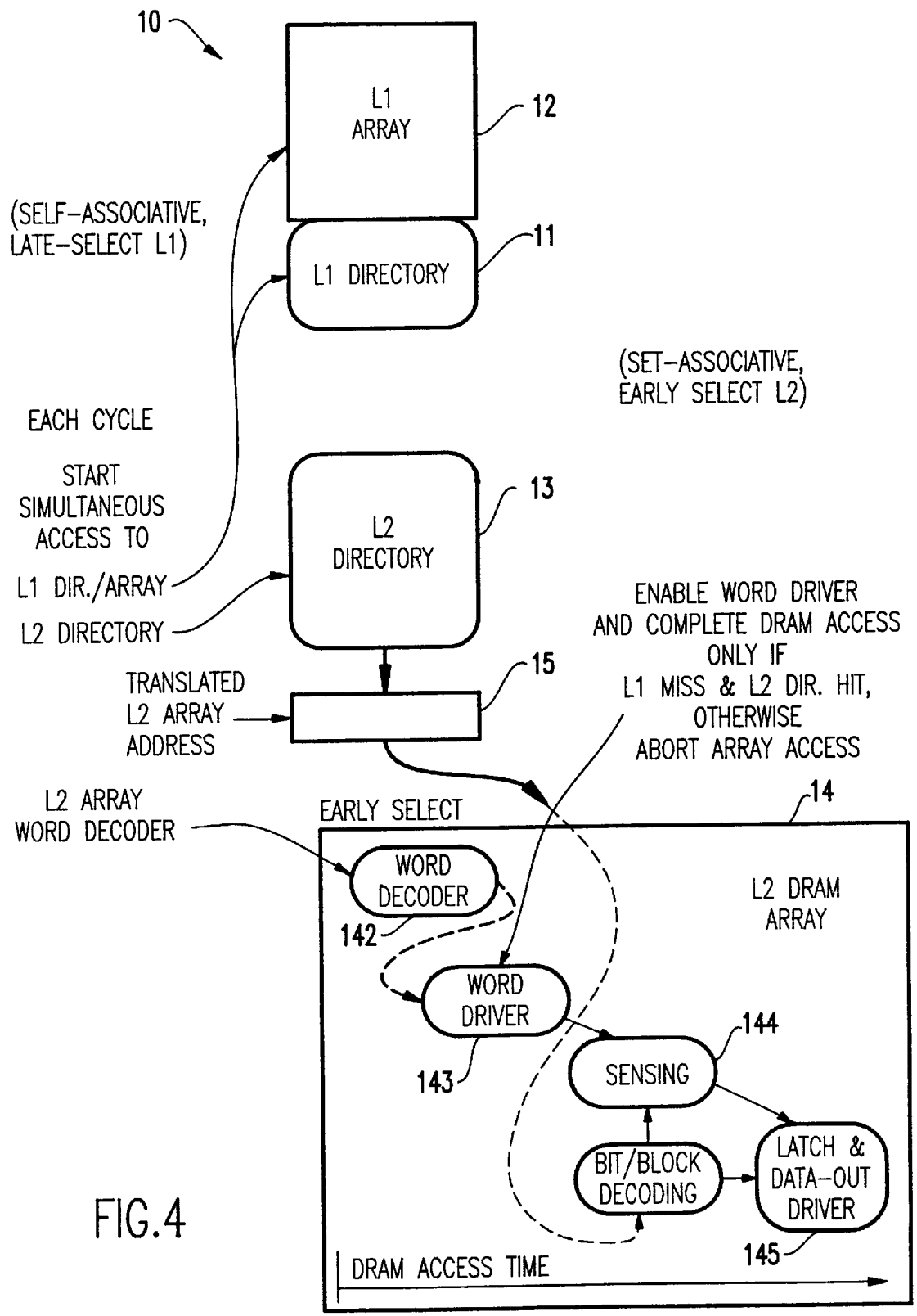
FIG. 4 is a block diagram of an early-select, set-associative L2 cache using an L2 array having an external word-driver enable input and access abort capability in which the L2 cache is started each cycle simultaneously with the L1 cache.

CASE III
Set-Associative, Late-Select, One-Cycle L1 Cache, Set-Associative One-Cycle L2 Directory, Set-Associative EARLY-Select L2 Data Array This organization incorporates an early-select, set-associative L2 directory and array, using a DRAM L2 data array which includes an external Word-Driver enable and abort signal (which can be same or two different signals). The overall organization of L1 and L2 is shown in FIG. 4. The L1 cache 10 can be a typical set-associative, late-select organization. At the start of each cache access cycle, the congruence class of typically four entries (for four-way set-associativity) is accessed from the L1 directory 11 simultaneously with the accessing of the congruence class of four logical words (e.g., four double-words) from the L1 cache array 12.

Figure 5:
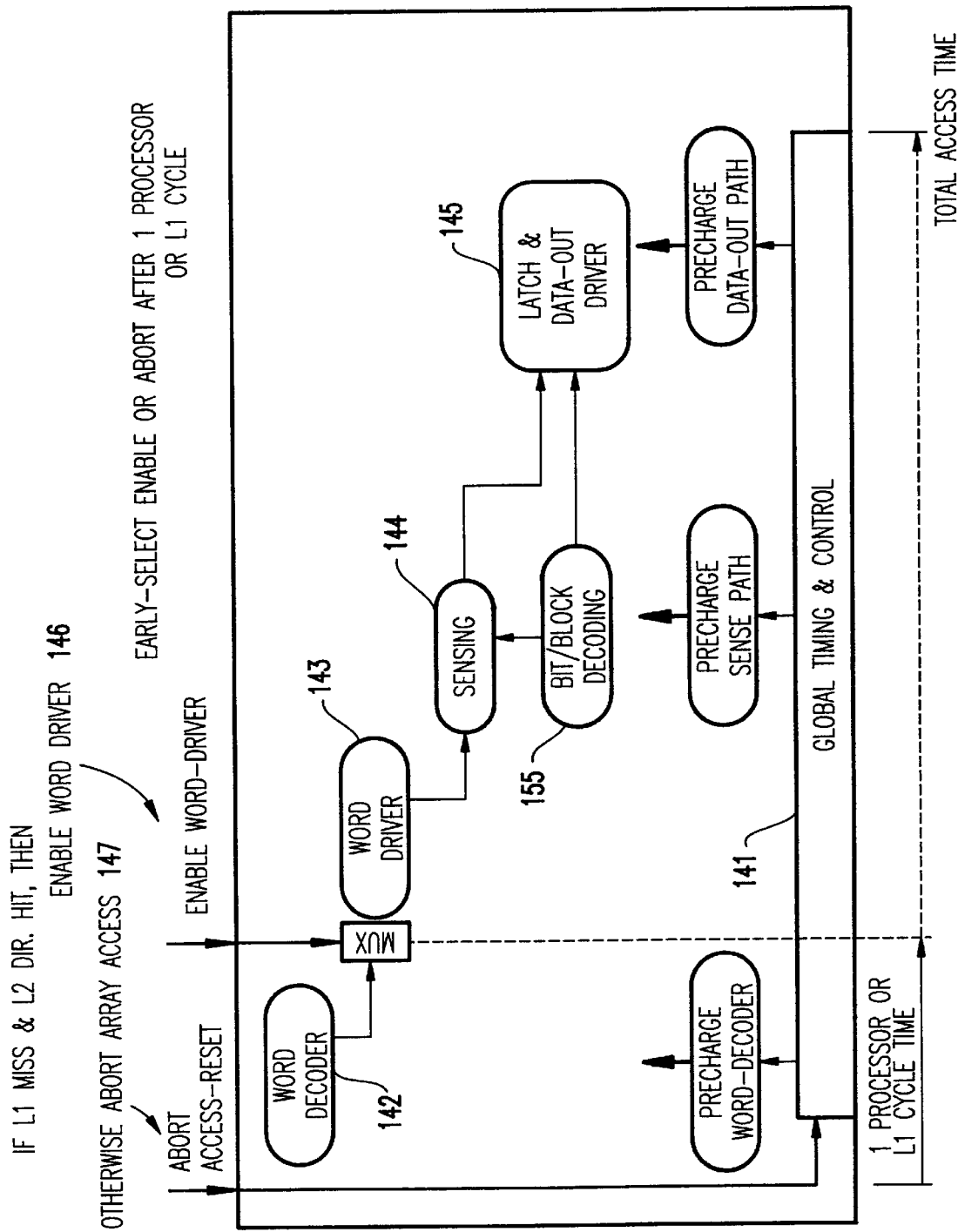
FIG. 5 is a block diagram of a DRAM access timing path showing a modification for early-select or abort.

In this Case III, the L2 directory 13 and L2 array 14 are also started at the same time. The congruence class of four entries (for four-way set-associativity) is accessed from the L2 directory 13. However, the L2 array 14 is accessed completely differently than any other arrays. To understand the operation, it is necessary to consider the internal operation of a DRAM chip. FIG. 5 shows an L2 DRAM chip with the various steps normally required to perform a DRAM access. In a standard, ordinary DRAM, all the logic and control functions, with few exceptions, are controlled by some on-chip Global Timing and Control circuits 141 similar to that shown in FIG. 5. In standard DRAM designs, first the word line address is received (sometimes latched, but an option) and decoded. The decoder 142 grounds all word lines except that one to be driven. Then the Word Driver 143 is internally started which accesses all bit lines along that physical word line. Then the sensing circuits 144 come into play, followed by the data latching and data-out drivers 145. The DRAM chip used in the organization of FIG. 4 has two additions, as indicated in FIG. 5. The timing and control of the chip is augmented by the addition of signals from two special circuits, one an ENABLE Word-Driver 146, and the other, ABORT Access-Retry 147. These work as follows.

In FIG. 4, the L2 data array 14 access is started at the same time as the L2 directory 13, but the access only proceeds internally up to the Word Driver 143. The word line, or group of word lines or decoders on several islands of the chip will, together, access the congruence class of L2 blocks for the same congruence class of the L2 directory. At this point, the L2 DRAM data array 14 waits for an external signal to specify the next course of action. If there is a MISS in the L1 cache 10, a HIT in the L2 directory 13, and if the L2 directory access equals the L1 access, then the address for the correct one block of the L2 congruence class is immediately available. Thus, all remaining data array decoding, including any final word decoding if necessary, and the bit line decoding for this block can be started at this time. The DRAM completes its full access from this point on. However, if there is an L1 cache HIT, this will be known at the end of the DRAM Word decoding period. Then the remainder of the access is aborted and the DRAM is reset to begin a new word decoding on the very next cycle. All this is possible because none of the sense circuits nor output circuits have been disturbed which typically are the major factors in limiting cycle time. For a DRAM implemented in a high-speed logic technology, the Word Decoder circuits 142 can be made to be as fast as the L2 cache access by any number of techniques.

In FIG. 5, if the chips are implemented such that a full congruence class of blocks (e.g., four blocks for four-way, set-associative organization) are accessed with any word line, then the decoding of the bit lines for the correct block can start at the same time the word line is driven by the Enable-Word-Driver signal 146 (this decoding could be done, for example, in block 155). This will allow the array 14 to have only one full block width for its data-output path rather than a full congruence class as would be required for a true late-select organization.

Figure 6:
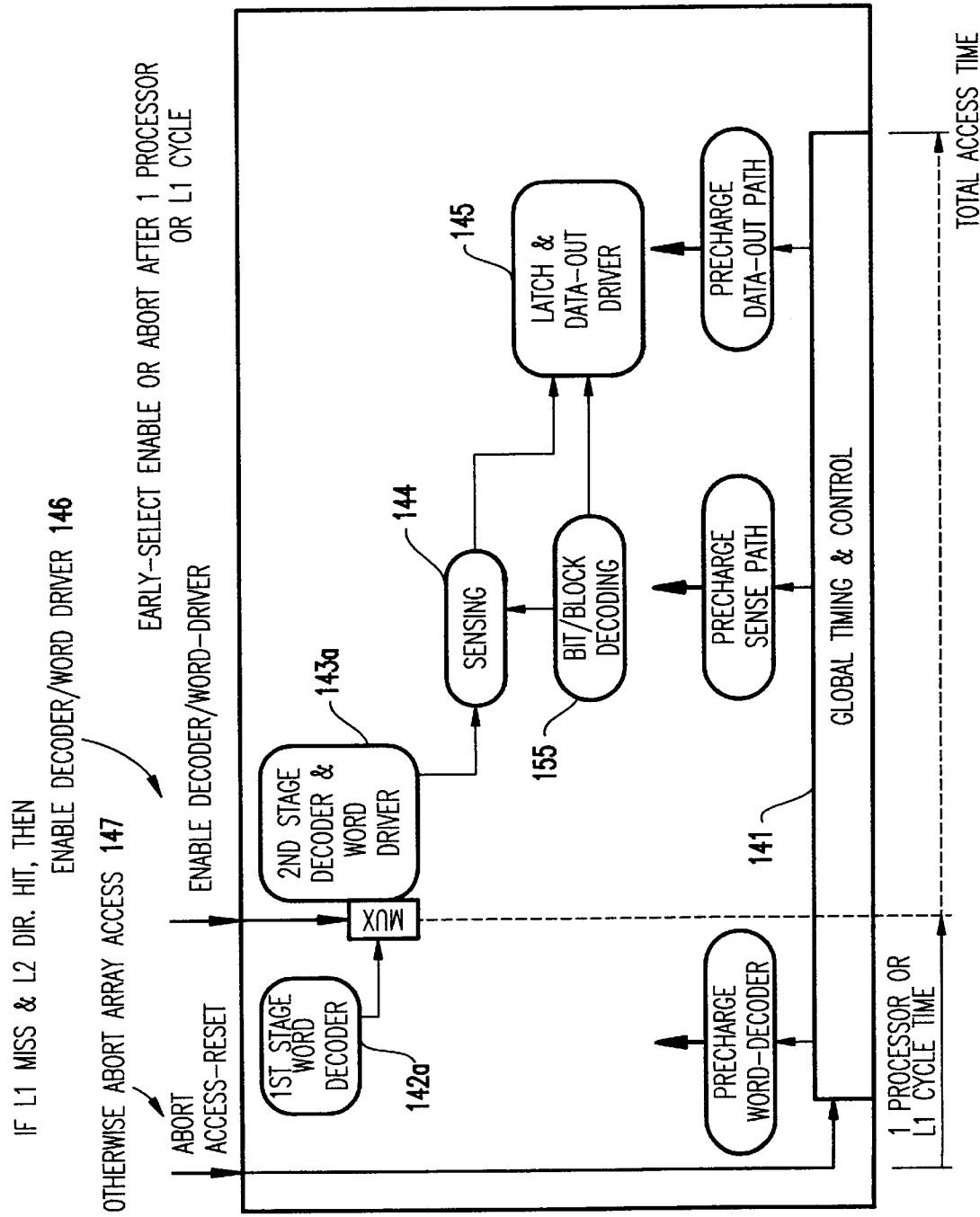
FIG. 6 is a block diagram for a DRAM access timing path showing modification for early-select or abort with two stage word decoder.

In a different chip organization, one could conceivably have a congruence class distributed over several word lines. For instance, for a four-way set associative organization, one could have the four blocks of each congruence class distributed over two or four word lines. The one required block of the congruence class is not known at the start of the directory/data-array access. In such a case, it may be desirable to do the word decoding in two stages as shown in FIG. 6. The first stage 142a does the major decoding (e.g., to the congruence class which could be two or four word line) while the second stage 143a does a final simple decode (e.g., one of four blocks) and word driving to complete the access. Again, as previously, this organization allows the DRAM arrays to have to access only one block, i.e., the data-out path is one-block wide.

The above CASE III describes a very general Early-Select Abort/Continue L2 design which can be applied to many other cases. Several specific applications to other such cases are included below:

CASE III.2
Multiple L1 caches, Each With Private, Early-Select L2 Cache

Figure 7:
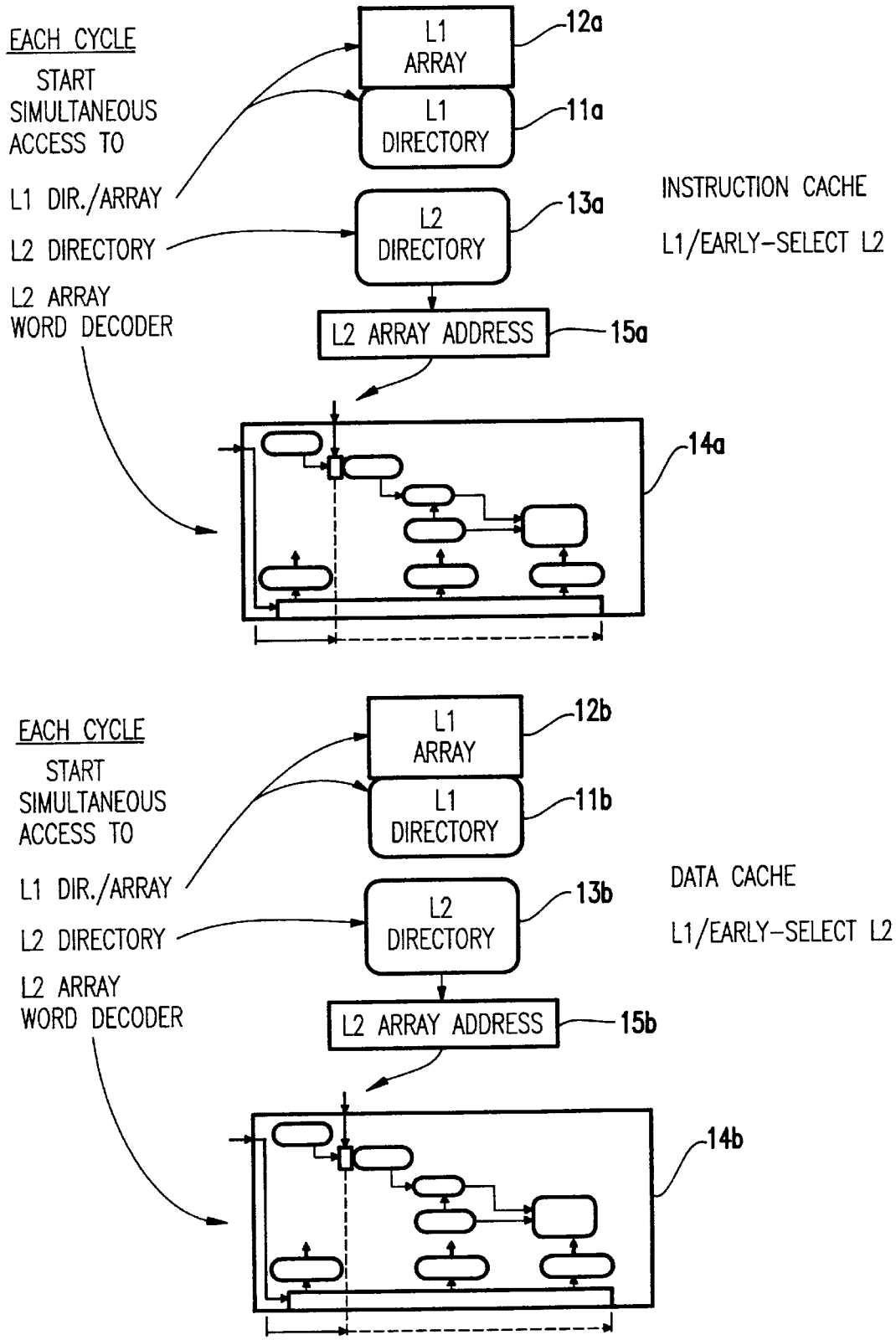
FIG. 7 is a block diagram showing a split L1 instruction and data cache, each with its own private early-select L2 cache.

In the previous CASE III, the L1 Directory/Array and L2 Directory/Array are started at the same time. This configuration and organization can be advantageous in systems which use a single L1 cache (combined Instruction and Data cache) with an attached L2 cache as indicated. Even in cases which have the L1 cache split into a separate L1 Instruction cache (I-cache) and L1 Data cache (D-cache), if a separate, private L2 cache is used for each of these, then the configuration of FIG. 4 is workable and desirable. The L1 I-cache can have its own private L2 early-select I-cache, and similarly, the L1 D-cache will have its own separate, private L2 early-select D-cache as indicated schematically in FIG. 7, wherein the suffixes "a" and "b" on the reference numerals indicated I-cache and D-cache, respectively. The two private L2 caches can be accessed separately and in parallel, thus giving twice the bandwidth of a single L2 cache.

CASE III.3

Multiple L1 caches, all sharing one early-select L2 cache

Figure 8:
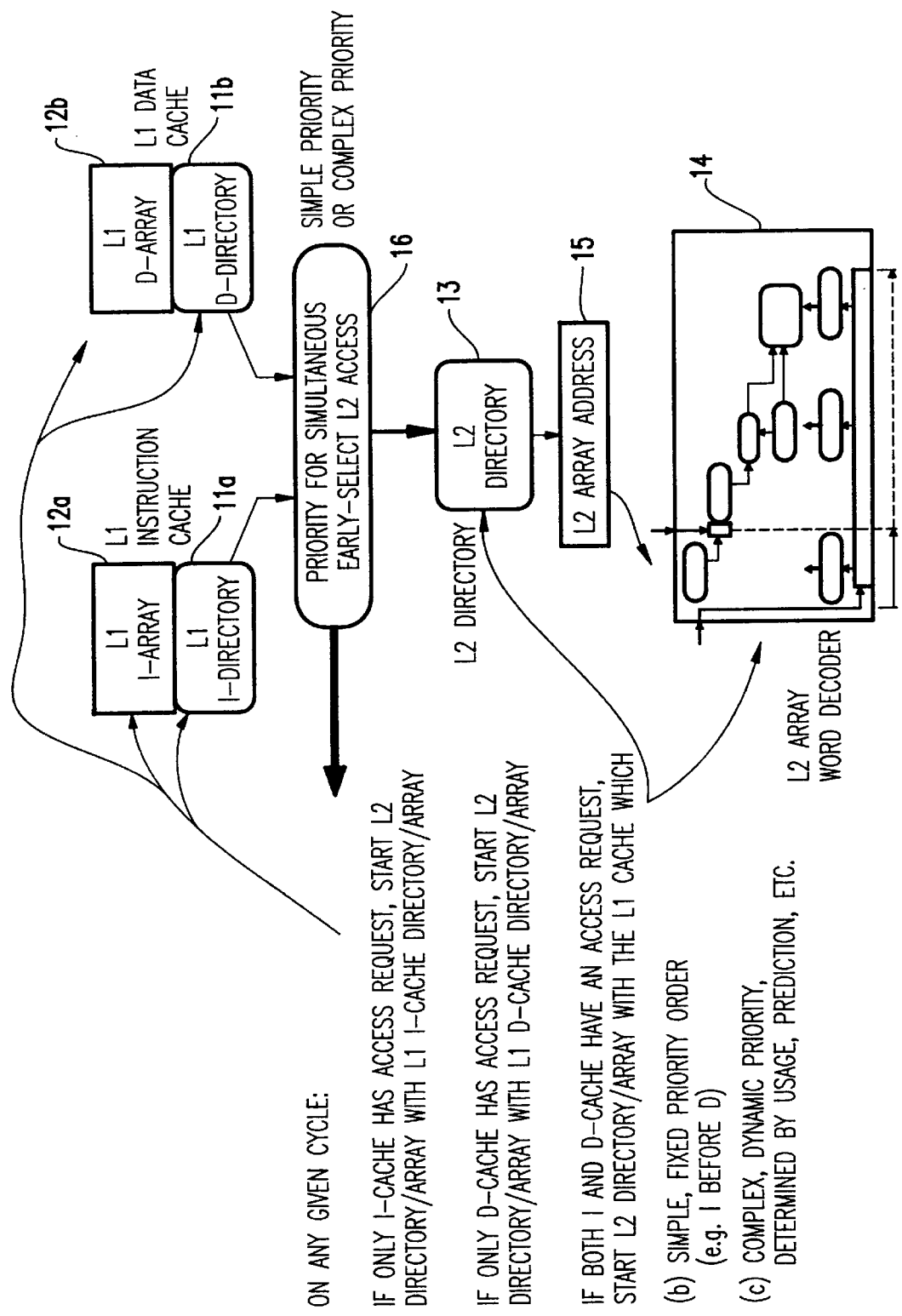
FIG. 8 is a block diagram of a split L1 instruction and data cache using one shared L2 early-select cache with simple or complex priority for determining which L1 cache access is overlapped with early-select L2 access.

For cases which use, for instance, a split I and D cache and have one shared L2 cache, then the configuration of FIG. 4 must be modified. In such a case, the shared L2 cache can still be an early-select organization with a number of possible choices for when the L2 Directory/Array access can start, as follows. If there is only an I-cache access and no D-cache access, the L2 early-select access would be started with the I-cache, as indicated in FIG. 8. In an analogous manner, if there is no I-cache access on a given cycle, but only a D-cache access request, then the L2 cache is overlapped with the D-cache access.

In a more typical application, both the L1 I and D-caches can have an access on any given cycle. Since either L1 can MISS at random, we do not know which one will want to access the L2 cache. In the most simple and least desirable case, the early-select L2 Directory/Array access can start after a MISS occurs in either the L1 I-cache or L1 D-cache, since we then have the correct address and destination of the block to fetch from the L2. By so doing, the L2 cache lies idle during the L1 access which is wasted time. We can "take a chance", so to speak, by making some assumptions or guess about which L1 cache might MISS, and start a simultaneous access in L2 cache for that guess. For instance, suppose that when both caches are accessed and a MISS occurs in both, the design specifies via the priority circuit 16 that the L1 I-cache will always have priority over a simultaneous D-cache MISS. For such a design/priority specification, when both caches are simultaneously accessed, we would start the L2 access overlapped with each L1 I-cache access as shown in FIG. 8. If the L1 I-cache has a MISS, we are one cycle ahead in the L2 access. A simultaneous D-cache MISS would wait in any case. If the L1 I-cache HITS but the D-cache MISSes, we are no worse off since the L1 I-Cache HIT will Early-Abort the L2 access after the HIT is known. The L2 access for the D-cache MISS will start at the same time for this overlapped case as it would for the case of no overlap between L1 and L2 cache accesses. Of course, the priority on L2 cache access could be D-cache MISS before I-Cache, in which case, the L2 access would always be overlapped (started) with the D-cache access, if there was one.

The above, simple, fixed priority of I-over-D-cache (or D-over-I-cache) access can be a dynamically varying selection, such as to change priority every other access, or every so many accesses, or a prediction scheme, etc., as indicated in FIG. 8. In any case, the early-select can be used with or without overlapped L1 accesses and has a distinct advantage for all cases.

CASE IV

Pipelined Output Buffers With or Without Early-Select L2 Array

Figure 9:
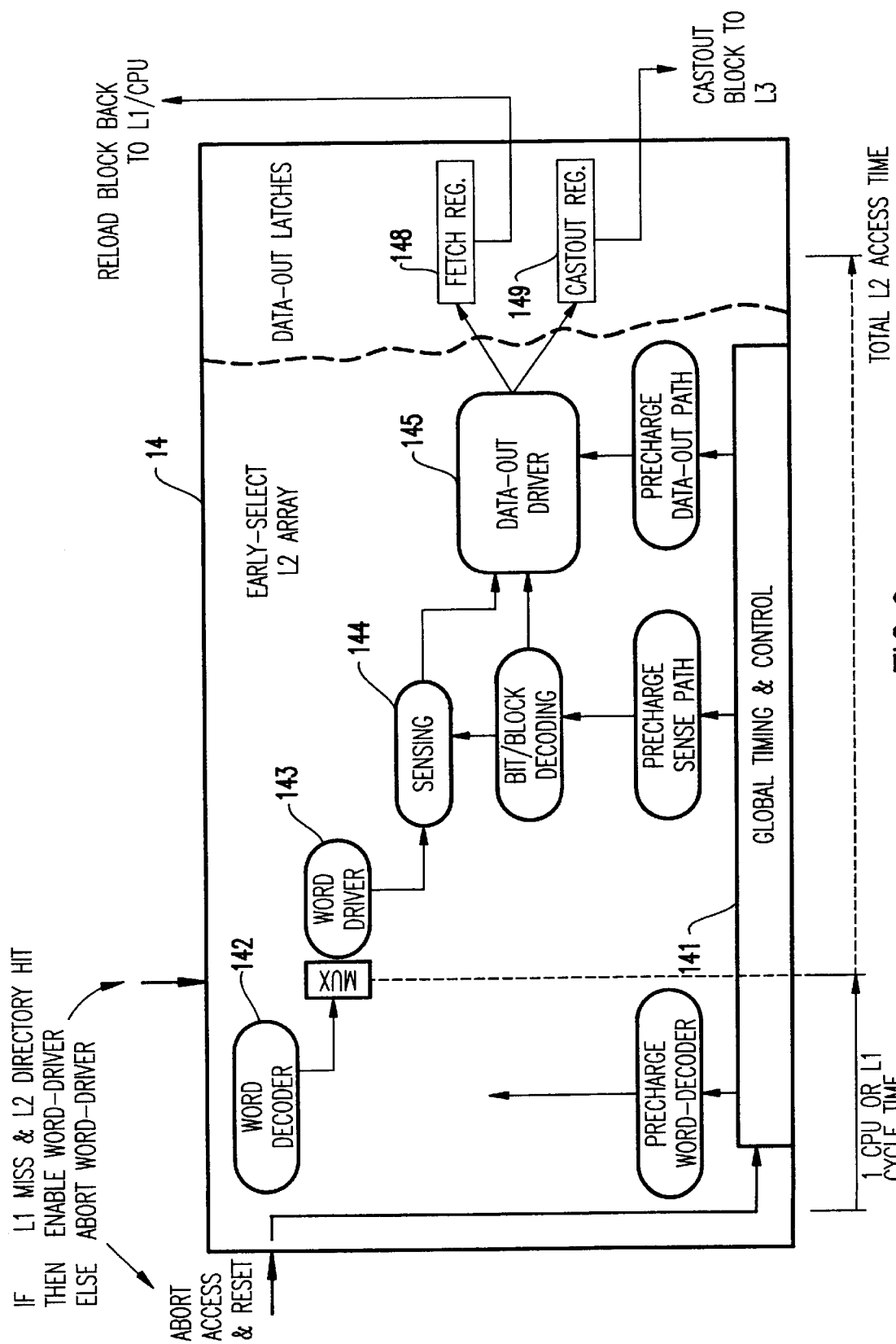
FIG. 9 is a block diagram showing an L2 cache array with two separate data-out latches, fetch register and cast out register.
Figure 9A:
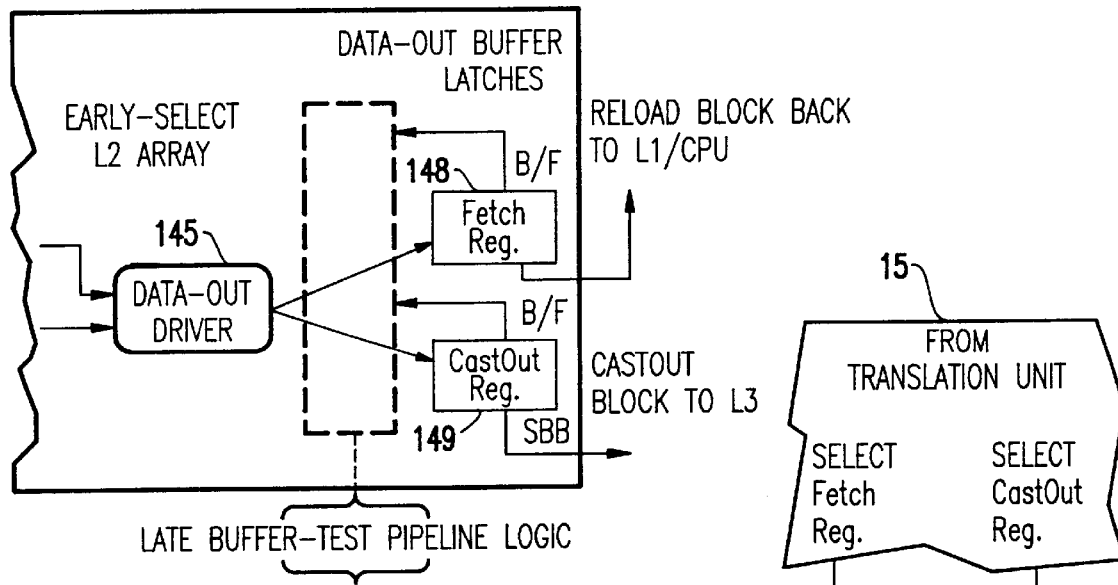
FIG. 9A is an enlarged portion of FIG. 9 used to describe a busy/free signal associated with the fetch and cast out registers.

Memory hierarchies typically use output buffers on the L2 (or L3, L4) data array to latch the requested block, and provide a multi-cycle transfer for reload back to L1 cache and similarly for a cast out to L3 cache or main memory. For instance, an L2 data array can be organized as shown in FIG. 9 in which a fetch register 148 is used to hold a block fetch for reloading an L1 cache MISS, and a separate cast out register 149 (or Store Back Buffer, SBB) for holding a block which must be cast out to L3 due to an L2 cache MISS (assuming a store-in L2 cache). The transfer of these buffers to their respective targets can require many processor cycles and can still be busy when a new L2 access is needed. Typical memory array designs are such that once an access is started, it goes to completion. If we need to fill the fetch register for a new access and it is still busy, we typically wait. The question is, at what time, and with what TEST, do we decide to start the array access? If we wait until the fetch register is totally free, we waste cycles. For instance, if the array access is, say, four processor cycles, and at any given moment, three cycles or less are needed to complete the transfer of the fetch register, then we can start the array immediately, overlapped with the fetch register transfers, and the latter will be free by the time the array Data-Out driver 145 (input to the fetch register) is asserted for the new block. Thus, we can overlap the array access with the fetch register transfer. A similar situation occurs with the cast out register buffer 149. A problem in attempting this type of pipelining is that we do not know until the translation is completed whether the fetch register 148 or cast out register 149, or neither, will be needed. Thus, the L2 cache will have to be organized as either a sequential or early-select Directory/Array. Since a sequential organization would already lose one cycle on translation, it is not attractive. An early-select array will have the special ABORT/CONTINUE feature on the word driver, and can easily have another addition to further improve the pipelining capability for a faster effective L2 cache. This can be achieved with a pipelined L2 cache array design as follows.

Late Buffer-Test

Figure 10:
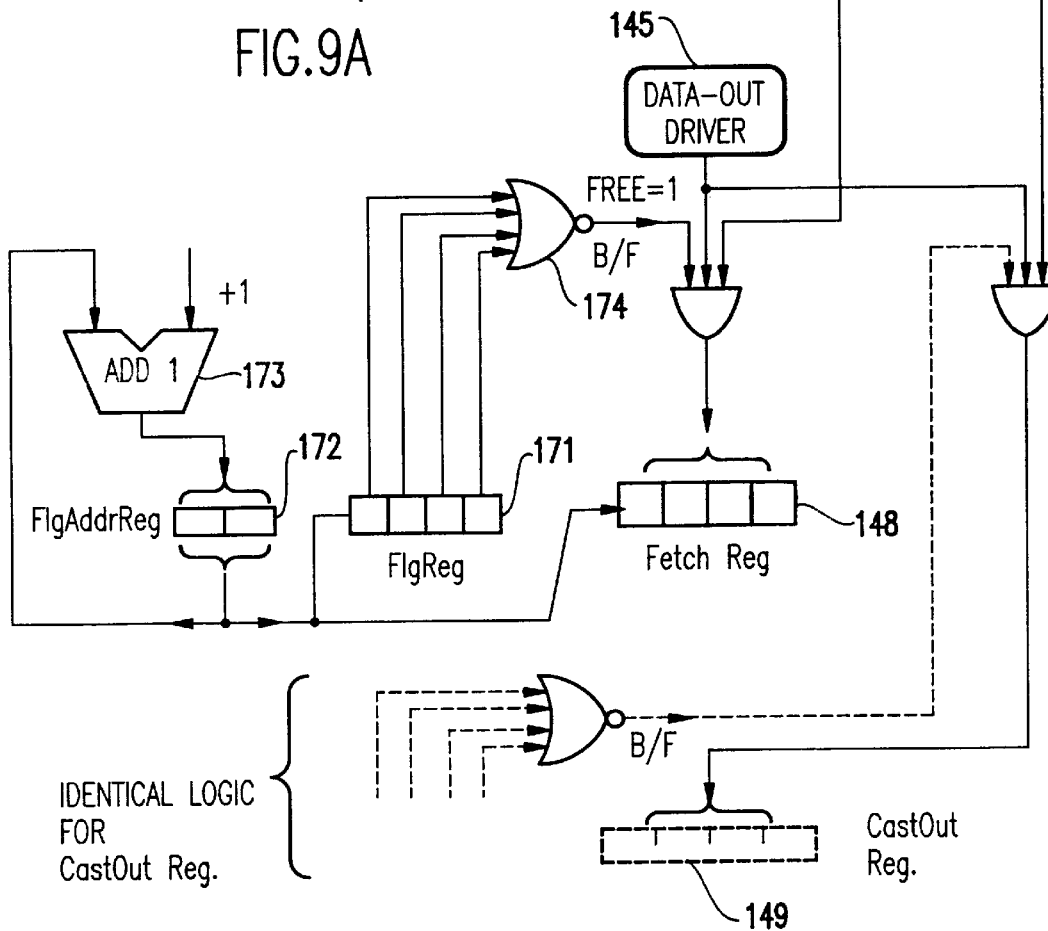
FIG. 10 is a block and logic diagram illustrating additional functions integrated on a RAM chip to provide "Late Buffer—Test" pipelining on the output buffers.

An array access starts without testing availability of either the fetch register 148 or cast out register 149. At the end of the array access, just before needing either the fetch register 148 or cast out register 149 (the one needed will be known at end of translate), a busy/free signal, BF, associated with the needed register will control the subsequent action. This is illustrated in FIG. 10 and works as follows. If the fetch register 148 is needed and its BF signal is Busy, the array Data-Out driver 145 (a static circuit if necessary) maintains its asserted outputs until the BF signal accepts them into the fetch register 148 and enables a reset on the data-out buffers and array input; similarly, with the cast out register 149. In this manner, the pipeline is kept as full as possible, given the multiple cycle access of the array and transfer of the fetch register 148 and cast out register 149.

The Busy/Free signal, BF, and associated logic can be very simple, as shown in FIG. 10. Both the fetch register 148 and cast out register 149 have separate flag registers, FlgReg 171, which have one bit for each Logical Unit, LU, of data transferred out of the respective register 148 or 149. In addition, each FlgReg 171 has a simple address register, FlgAddrReg 172, and a simple "ADD 1" address incrementer 173 which works as follows. Whenever the respective register, fetch or cast out register, is initially loaded, the flag bits in FlgReg 171 are all set to one and the FlgAddrReg 172 is loaded with the address of the logical word or Logical Unit which caused the MISS. Thus, the FlgAddrReg 172 points to both the first Logical Unit to be transferred from the fetch register 148 to the central processing unit/L1 cache (CPU/L1), and the respective flag bit. When this Logical Unit, LU, is transferred, the flag bit pointed to by the flag address is reset to zero and the FlgAddrReg 172 is incremented by plus one. It thus points to the next LU to be transferred and the next flag to be reset to zero. The Busy/Free signal is obtained from NOR gate 174 connected to the outputs of all the flag register bits. Thus, when all flag bits go to zero, the output of the NOR gate 174 goes to one which represents the "free" state of the fetch register 148 (arbitrary logic—states could be reversed, if desired). As illustrated, the FREE signal will be zero while any flag bit is one (indicating a transfer still in progress). This prevents the output of the data-out driver 145 from setting the fetch register, as well as holds the Drivers in the asserted state. When all flags go to zero (transfer completed), the FREE signal goes to one, enabling the new input state into the fetch register 148 and resetting the drivers as well as all necessary input ports to the array (reset and other controls not shown, these being standard state of the art). The "select" signal which specifies whether the fetch register or cast out register is to be set, will be obtained from the translation unit 15 as indicated. A Reload-fetch HIT will enable the fetch register while a MISS with cast out will enable the cast out register 149.

The cast out register 149 works in a completely analogous manner with its own flag register, address register and address incrementer as indicated at the bottom of FIG. 10. Typically, the cast out block does not require Load-Through so the transfer always starts at the same Logical Unit boundary (the first one). However, since some type of address register is needed to decode to the individual LU for transfer, the cast out logic would be essentially identical to that used for the fetch register. Hence, transfers could start at any LU boundary, just as for the fetch register, if desirable. This type of pipelining on the array Data-Output buffer registers is referred to as "Late Buffer—Test."

Early Buffer—Test

Figure 11:
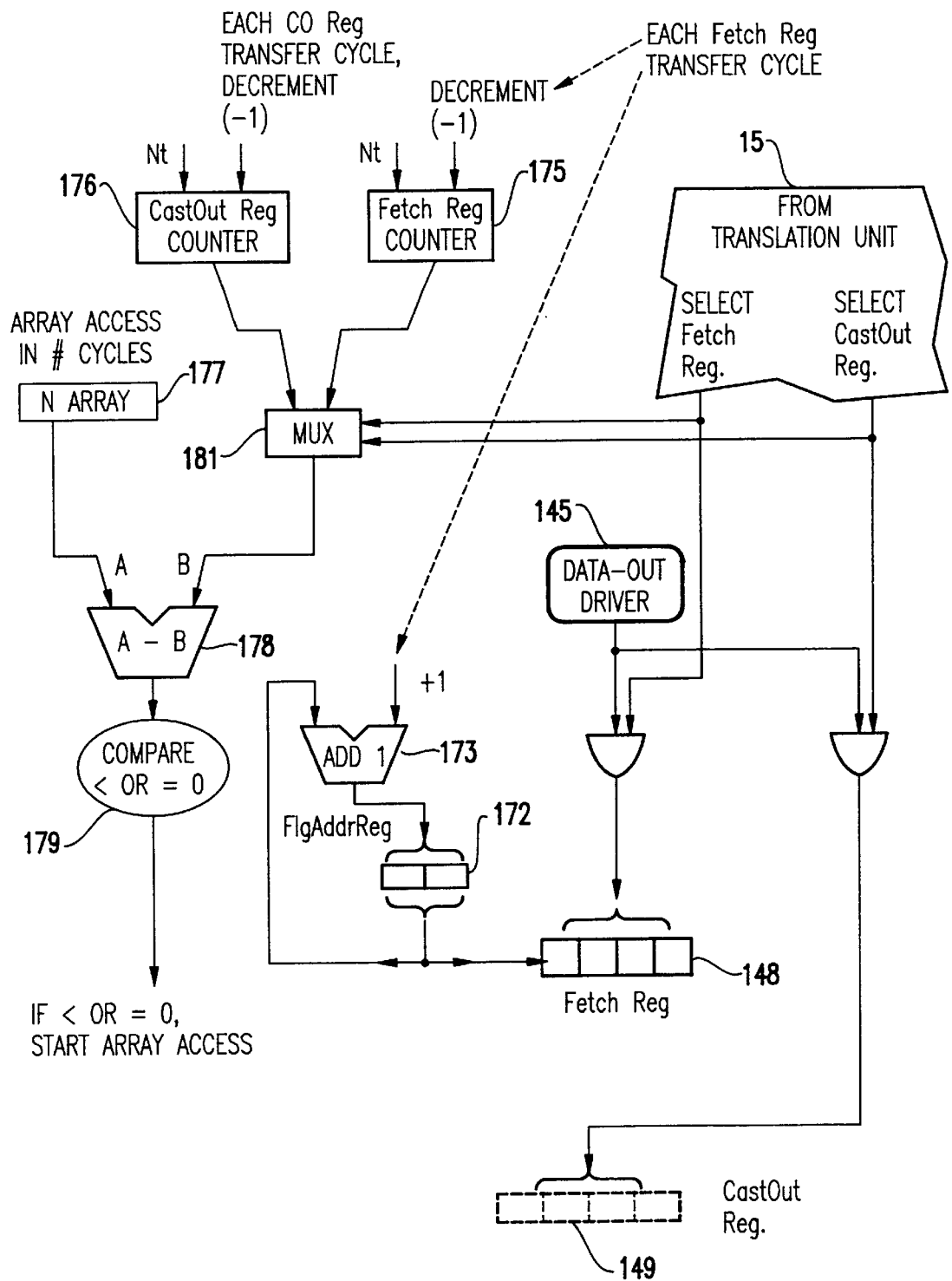
FIG. 11 is a block and logic diagram illustrating additional functions integrated on a RAM chip to provide "Early Buffer—Test" pipelining on the output buffers.

Rather than implementing the "Late Buffer—Test" pipelining as above, an alternative, shown in FIG. 11, is possible as follows. We can use some additional external logic to keep count of the number of cycles left for the fetch register and Cast out register to become empty, and knowing the L2 array access time, it is possible to calculate the exact best cycle to start L2 array access for perfect pipelining. Thus, the test on the availability of the needed buffer is done early, and the array started at exactly the right time based on this test. This is called "Early Buffer—Test" pipelining. Regardless of what organization is used for the Directory/Array, i.e., sequential, early-select, or whatever, the following must be done after the translation has been completed and specifies which buffer is needed. This is assumed to be the case.

The fetch register 148 and cast out register 149 each need a separate counter 175 and 176, respectively, which keeps track of the remaining number of cycles required to transfer the respective register to its target. This counter is initialized to some fixed value (total number of transfer cycles required) whenever the respective register is filled. Each subsequent cycle of transfer decrements the respective counter as illustrated at the top of FIG. 11. As previously described for the "Late Buffer—Test" case, the fetch register 148 will still require the simple address register, FlgAdReg 172, and a simple "ADD 1" address incrementer 173 which works as previously described. These are needed to allow Load-Through to start on any logical unit boundary and wrap (the flag register is not needed). The cast out register 149, since it does not need to support Load-Through, does not need the incrementer nor the address register; it can use its counter 176 as an address register.

A separate, additional register 177 in needed which holds the count of the number of cycles required for array access (fixed value, but must be initialized at Initial Program Load, IPL, time). Whenever an array access is needed for, say, the fetch register, the remaining count value of counter 175 for the fetch register 148 is subtracted from the array count value by arithmetic logic unit (ALU) 178. When this value is less than or equal to zero (as determined by compare circuit 179), the array access is enabled. Otherwise, it is delayed; similarly for the cast out register 149. If the translation unit 15 indicates the cast out register 149 is needed, the remaining cast out count value obtained from the cast out counter 176 via the multiplexer (MUX) 181 is subtracted from array count value the as illustrated. The result is compared to zero, and causes the array access to start, or be delayed as above.

Early Buffer test NOW (for Full Availability)

It should be obvious to one skilled in the art that the two cases of pipelining the "Late Buffer—Test" and the "Early Buffer—Test" can have a simplified, degenerated implementation as follows. In the "Early Buffer—Test" case, logic circuits and counters keep track of whether the fetch register or Store Back Buffer (SBB), whichever is needed, will be available at the time the array data out would become asserted. A simpler implementation would be to eliminate the extra circuits and just test if the needed buffer is available "NOW", before the array is started. When used with an early select array structure, this would work as follows. The L2 directory and word decoder are started at the same time as the L1 cache. At the end of the L1/L2 translation/L2 word decoder cycle, if an L1 MISS occurs, the result of the L2 directory is then used as follows:

If an L2 directory HIT occurs and the L2 fetch register is free "NOW", then the array access is continued for the L1 reload. If fetch register is not available "NOW", abort array access and repeat the request (retry).

If an L2 MISS occurs and there is no cast out required, the array access is aborted and a reload request is sent to L3 cache or main memory immediately.

If a MISS occurs and a cast out is needed, then the array is started (for the cast out) only if the Store Back Buffer (SBB) (or cast out register) is free "NOW"; otherwise, abort array and repeat the request.

If this implementation is used, there will obviously be cases which will be aborted because the fetch register or SBB was not available "NOW" but would have been successful if the "Early Buffer—Test" implementation, above, had been used. However, this is a much simpler case to implement, requiring a simpler array/logic design.

This Early-Select L2 with additional pipelining ("Late Buffer—Test", "Early Buffer—Test") on L2 cache output buffers can be used in any of the previous organizations, with or without L1 overlapping. In addition, the pipelining feature of the L2 cache array chip can be used with or without an early-Select RAM design. However, if a custom chip design is undertaken to achieve the pipelining feature, this would facilitate the addition of the early-select feature and would be desirable. In any case, this is a design option.

CASE V
A Memory Hierarchy which includes an L3 LEVEL using an EARLY-SELECT organization similar to L2

It is well known that at all levels of a memory, the inherent access delay for any block reload causes a degradation of the overall system performance. Thus, further performance improvements can be obtained by decreasing the first access delay Tmiss(IV) at any and all levels of the hierarchy. In the case of a hierarchy having L1, L2, and L3 caches, both the L2 and L3 caches can have the early-select organization shown in FIGS. 4, 7 or 8 and/or the pipeline structure of FIG. 10 or 11. In a merged-logic technology, all the directories for L1, L2 and L3 caches can be placed on the processor chip and started at the same time. For a MISS in L1 and L2 caches, the L3 data array can be started on the second cycle, which is a substantial improvement over current organizations. This can provide a significant performance benefit is some cases.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer memory system having a hierarchy comprising:
    a level one (L1) cache with access/cycle time equal to or faster than a processor cycle time which can deliver at least a logical word or words needed by the processor on each cycle for an L1 HIT; and
    an L2 cache including a directory and data array in which the L2 directory is accessed for a MISS to the L1 cache, the L2 data array having a mapping from the L2 directory to the data array such that at least one block needs to be accessed from the data array, the L2 directory performing required address translation and, upon a HIT, enables the L2 array for a specific block required for reloading into the L1 cache, and upon a MISS, the L2 cache requests a block reload from a next level of the hierarchy, wherein the L2 cache directory has an access time greater than one processor cycle and a cycle time equal to one processor cycle, the directory and associated logic of the L2 cache being a pipelined design to allow a new access to start each cycle by starting the L2 cache data array and the L2 cache directory at the same time as an L1 cache access, the L2 data array implementing an early-select structure and organization to allow the array to start an access on each L1 cache cycle, to abort data array access at an end of one cycle if a HIT in L1 cache or MISS in L2 cache directory with no cast out, and to continue and complete a block access for a MISS in L1 cache and a HIT in L2 cache directories, thereby saving at least one cycle or more of data array access for a block reload access.

2. The computer memory system of claim 1 in which a MISS in the L1 cache coupled to a MISS in the L2 cache with an L2 cast out results in a continued array access for a cast out block.

3. The computer memory system of claim 1 in which the L2 data array is a DRAM array.

4. The computer memory system of claim 3 in which the DRAM array has an early-select capability consisting of a word decoder/driver enable signal causing completion of a data array access and an abort-cycle signal aborting the access, resetting circuits and allowing a new access on a very next processor cycle.

5. The computer memory system of claim 4 wherein the DRAM word decoder/driver enable signal enables a Word-Driver of a previously decoded word line to complete the access, giving a single block of data as output.

6. The computer memory system of claim 4 wherein the DRAM word decoder/driver enable signal enables a second stage word decoder and word driver to complete the access to a single block data-out path.

7. The computer memory system of claim 6 wherein word decoding is accomplished in two stages by first and second decoders, the first decoder decoding down to a congruence class by selecting Nc out of all word lines and the second decoder selecting one out of Nc where Nc is the number of blocks in the congruence class.

8. A computer memory system having a hierarchy comprising:
    a split level one (L1) cache composed of an instruction cache (I-cache) and a data cache (D-cache) with access/cycle time equal to or faster than a processor cycle time which can deliver the logical word or words needed by the processor on each cycle for an L1 HIT; and
    private L2 caches for each of the I-cache and D-cache, each of said private L2 caches including a directory and a DRAM data array in which the L2 directory is accessed upon a MISS to the L1 cache, the L2 data array having a mapping from the L2 directory to the data array such that one block needs to be accessed from the data array, the L2 directory performing required address translation and, upon a HIT, starts access to the L2 array for a specific block required for reloading into the L1 cache, and upon a MISS, the L2 cache requests a block reload from a next level of the hierarchy, an L2 cache directory access starting on each and every cycle that its corresponding L1 cache access starts, with the L2 cache directory having capability to perform a translation on each cycle, as required, the L2 cache data array as well as the L2 cache directory being started at the same time as an L1 cache access, the L2 data array implementing and early-select structure and organization to allow the array to start an access on each L1 cache cycle, abort data array access at an end of one cycle if a HIT in L1 cache or MISS in L2 cache directory with no cast out, and to continue and complete a block access for a MISS in L1 cache and a HIT in L2 cache.

9. The computer memory system of claim 8 in which the DRAM arrays of the private L2 caches have an early-select capability comprising a word decoder/driver enable signal causing completion of a data array access and an abort-cycle signal aborting the access, resetting circuits and allowing a new access on a very next processor cycle. Word-Driver of a previously decoded word line to complete the access, giving a single block data-out.

10. The computer memory system of claim 9 wherein the DRAM word decoder/driver enable signal enables a Word-Driver of a previously decoded word line to complete the access, giving a single block of data as output.

11. The computer memory system of claim 9 wherein the DRAM word decoder/driver enable signal enables a second stage word decoder and word driver to complete the access to a single block data-out path.

12. The computer memory system of claim 11 wherein word decoding is accomplished in two stages by first and second decoders, the first decoder decoding down to a congruence class by selecting Nc out of all word lines and the second decoder selecting one out of Nc where Nc is the number of blocks in the congruence class.

13. A computer memory system having a hierarchy comprising:

a split level one (L1) cache composed of an instruction cache (I-cache) and a data cache (D-cache) with access/cycle time equal to or faster than a processor cycle time which can deliver the logical word or words needed by the processor on each cycle for an L1 HIT; and a shared L2 cache for the I-cache and D-cache, said shared L2 cache including a directory and a DRAM data array in which the L2 directory is accessed upon a MISS to the L1 cache, the L2 data array having a mapping from the L2 directory to the data array such that one block needs to be accessed from the data array, the L2 directory performing required address translation and, upon a HIT, starts access to the L2 array for a specific block required for reloading into the L1 cache, and upon a MISS, the L2 cache requests a block reload from a next level of the hierarchy, an L2 cache directory access starting on each and every cycle that its corresponding L1 cache access starts, with the L2 cache directory having capability to perform a translation on each cycle, as required, the L2 cache data array as well as the L2 cache directory being started at the same time as an L1 cache access, the L2 data array implementing an early-select structure and organization to allow the array to start an access on each L1 cache cycle, abort data array access at an end of one cycle if a HIT in L1 cache or MISS in L2 cache directory with no cast out, and to continue and complete a block access for a MISS in L1 cache and a HIT in L2 cache.

14. The computer memory system of claim 13 in which the DRAM array of the shared L2 cache has an early-select capability comprising a word decoder/driver enable signal causing completion of a data array access and an abort-cycle signal aborting the access, resetting circuits and allowing a new access on a very next processor cycle.

15. The computer memory system of claim 14 wherein the DRAM word decoder/driver enable signal enables a Word-Driver of a previously decoded word line to complete the access, giving a single block of data as output.

16. The computer memory system of claim 14 wherein the DRAM word decoder/driver enable signal enables a second stage word decoder and word driver to complete the access to a single block data-out path.

17. The computer memory system of claim 16 wherein word decoding is accomplished in two stages by first and second decoders, the first decoder decoding down to a congruence class by selecting Nc out of all word lines and the second decoder selecting one out of Nc where Nc is the number of blocks in the congruence class.

18. The computer memory system of claim 17 wherein if both L1 I-cache and D-cache have a simultaneous access and an L2 early-select commences with the D-cache access.

19. The computer memory system of claim 17 wherein if both L1 I-cache and D-cache have a simultaneous access and an L2 early-select commences the L1 I-cache or D-cache access according to a variable priority.

20. The computer memory system of claim 19 wherein the variable priority is selected from the group consisting of reverse priority every predetermined number of accesses and a prediction based on a last predetermined number of MISSes.

21. An L1/L2 computer memory system having a hierarchy comprising:

a level one (L1) cache with access/cycle time equal to a central processing unit (CPU) cycle time which can deliver logical words or words needed by the CPU on each cycle for an L1 HIT; and an L2 cache including a directory and a DRAM data array requiring multiple CPU cycles to complete a full access, said L2 cache including a fetch register output buffer on an output side to hold a block for a multi-cycle reload back to L1 cache on an L1 MISS and L2 HIT, the fetch register being pipelined such that an array access can start independent of whether the fetch register is available.

22. The L1/L2 computer memory system of claim 21 wherein the availability of the fetch register is tested according to a "Late Buffer—Test" on a last CPU cycle of a multi-cycle access, and output drivers of the L2 array are enabled and reset if the fetch register is FREE using a BUSY/FREE signal, otherwise if BUSY, the output drivers being stalled until the fetch register is FREE.

23. The L1/L2 computer memory system of claim 22 wherein the L2 cache further includes a cast out register for implementing a store-in L2 policy, wherein the cast out register is pipelined using a BUSY/FREE signal to enable or stall the array output drivers, a choice of the BUSY/FREE signal for the fetch register or cast out register coming from an L2 translation unit.

24. The L1/L2 computer memory system of claim 23 wherein the L2 cache further includes BUSY/FREE logic for each of the fetch register and the cast out register comprising:

first and second flag registers, one flag register for each of said fetch register and cast out register, said flag registers storing a logical one bit for each logical unit of data to be transferred out of a respective one of the fetch register and the cast out register;

first and second flag address registers respectively for the first and second flag registers, the first and second flag address registers being loaded with an address of the logical unit which caused an L1 MISS;

first and second address incrementers respectively for the first and second flag address registers, said first and second address incrementers incrementing respective addresses in the first and second address registers when a logical unit is transferred; and first and second NOR gates respectively connected to said first and second flag registers for generating a FREE signal when all bits of a respective flag register are set to logical zero.

25. The L1/L2 computer memory system of claim 21 wherein pipelining of the fetch register is determined by an "Early Buffer—Test".

26. The L1/L2 computer memory system of claim 25 wherein the L2 cache further includes a cast out register for implementing a store-in L2 policy, wherein pipelining of the cast out register is determined by an "Early Buffer—Test".

27. The L1/L2 computer memory system of claim 26 wherein the L2 cache further includes control logic for each of the fetch register and the cast out register comprising:

first and second address registers respectively for the fetch register and the cast out register, the first and second address registers being loaded with an address of the logical unit which caused an L1 MISS;

first and second address incrementers respectively for the first and second flag address registers, said first and second address incrementers incrementing respective addresses in the first and second address registers when a logical unit is transferred;

first and second counters respectively for the fetch register and the cast out register for keeping track of a remaining number of cycles required to transfer a respective register to its target; and differencing and compare logic for determining whether a count in a respective one of the first and second counters is less than or equal to a predetermined number of cycles required for L2 array access.

28. The L1/L2 computer memory system of claim 27 wherein functions of the incrementer and address register associated with the cast out register are performed by the cast out counter.

* * * * *